United States Patent [19]

DeForest

[11] Patent Number: 4,538,299

[45] Date of Patent: Aug. 27, 1985

[54] METHOD AND APPARATUS FOR LOCATING THE BOUNDARY OF AN OBJECT

[75] Inventor: Sherman E. DeForest, Del Mar, Calif.

[73] Assignee: International Remote Imaging Systems, Inc., Chatsworth, Calif.

[21] Appl. No.: 470,208

[22] Filed: Feb. 28, 1983

Related U.S. Application Data

[63] Continuation-in-part of Ser. No. 327,368, Dec. 4, 1981, abandoned.

[51] Int. Cl.³ ............................................. G06K 9/48
[52] U.S. Cl. .......................................... 382/21; 382/6
[58] Field of Search ................... 382/6, 21, 22, 54, 60, 382/27, 41; 358/107, 166, 96, 284; 377/10, 11

[56] References Cited

U.S. PATENT DOCUMENTS

| | | | |
|---|---|---|---|
| 3,899,771 | 8/1975 | Saraga et al. | 382/21 |
| 4,003,024 | 1/1977 | Riganati et al. | 382/54 |
| 4,060,713 | 11/1977 | Golay | 382/41 |
| 4,087,788 | 5/1978 | Johannesson | 382/21 |
| 4,097,845 | 6/1978 | Bacus | 382/6 |

OTHER PUBLICATIONS

Batchelor et al., "Fast Generation of Chain Code" *IEE Proc.*, vol. 127, Pt. E, No. 4, Jul. 1980, pp. 143-147.

*Primary Examiner*—Leo H. Boudreau
*Attorney, Agent, or Firm*—Limbach, Limbach & Sutton

[57] ABSTRACT

An apparatus and method for automatically locating the boundary of an object in a field of view has a raster scan device to generate an electrical image of the field of view. The electrical image is segmented and digitized to form a first representation. The image is then processed by comparing the digitized signal to a pre-set threshold to form a second representation. A converter combines each value of the pixel of the second representation with the values of the adjacent pixels into a single value and stores it in a corresponding location in a third representation. The values of the pixels in the third representation are read out and compared to a look-up table. A chain code of the boundary of the particle is formed from the look-up table.

16 Claims, 6 Drawing Figures

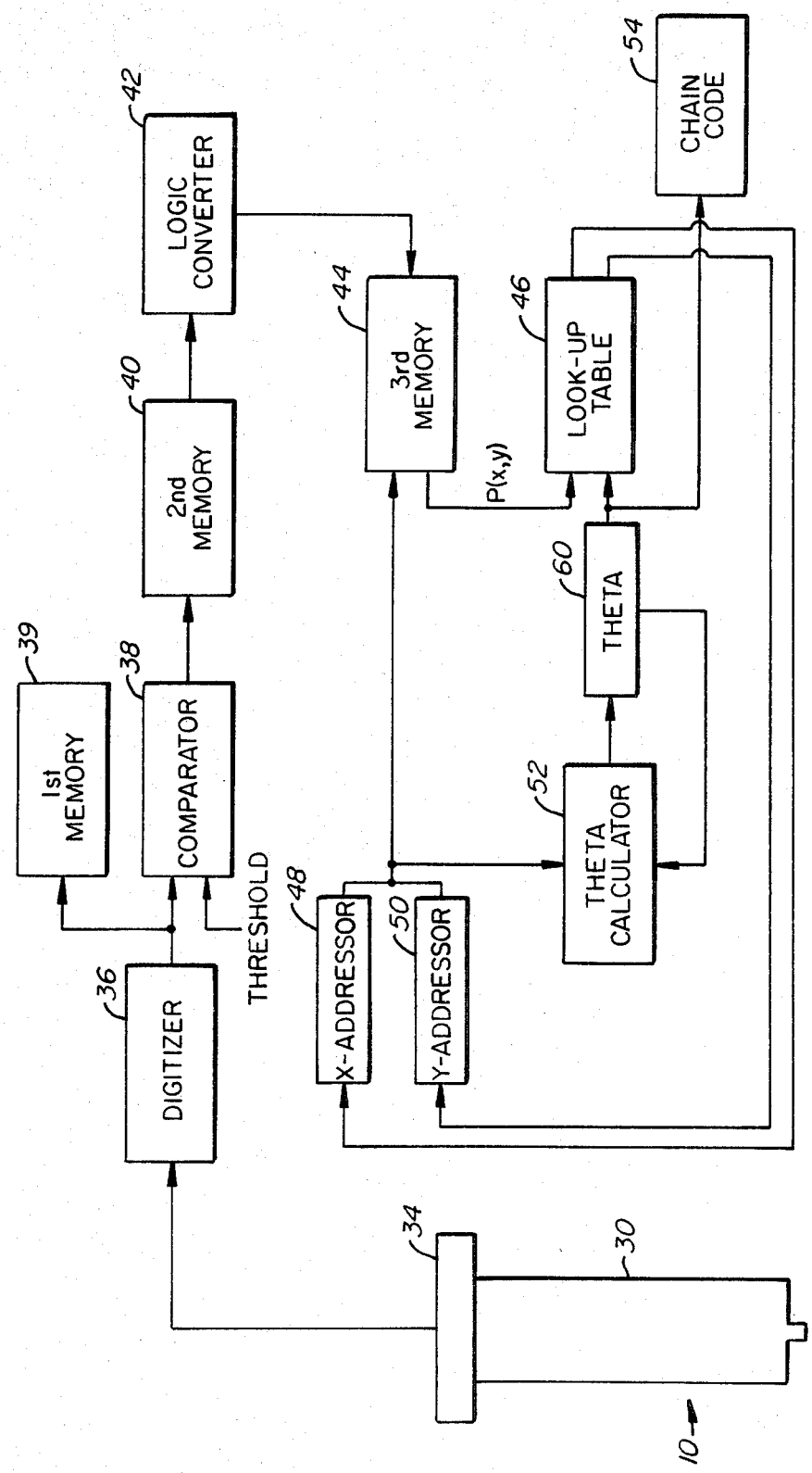
FIG._1.

```
g   d   h
c  [x,y]  a      P(x,y) = a·2⁷ + b·2⁶ + c·2⁵ + d·2⁴ + e·2³ + f·2² + g·2 + h
f   b   e
```
$$P(x,y) = a \cdot 2^7 + b \cdot 2^6 + c \cdot 2^5 + d \cdot 2^4 + e \cdot 2^3 + f \cdot 2^2 + g \cdot 2 + h$$
FIG._2.
```
0 0 0 0 0 0 0 0            0 0 0 0  0   0   0  0
0 0 0 0 1 0 0 0            0 0 0 0  76  0   0  0
0 0 0 1 1 1 0 0            0 0 0 205 0  110  0  0
0 0 1 1 1 1 1 0    →       0 0 137 0  0   0  102 0
0 0 0 1 1 1 1 0            0 0 0 155 0  0  118 0
0 0 0 0 1 1 1 0            0 0 0 0  147 179 50 0
0 1 0 0 0 0 0 0            0 0 0 0  0   0   0  0
0 0 0 0 0 0 0 0            0 0 0 0  0   0   0  0
     FIG._3a.                       FIG._3b.
```
FIG._3.
```
      2
   3     1
 4  (x,y)  0
   5     7
      6
THETA FROM A P(x,y)
```
FIG._4.
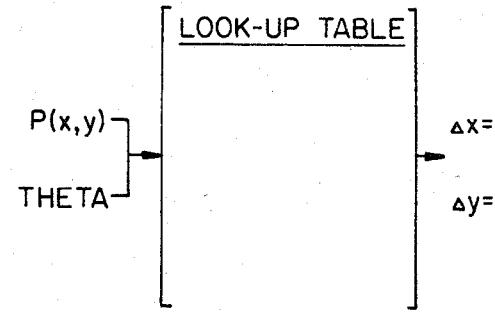
FIG._5.

METHOD AND APPARATUS FOR LOCATING THE BOUNDARY OF AN OBJECT

DESCRIPTION

1. Technical Field

The present invention relates to a method and an apparatus for locating the boundary of an object, and more particularly, to a method and an apparatus for automatically locating the boundary of an object in a field of view with a reduction in noise, error and the like.

2. Background Art

Microscopical Image Analysis, MIA, is well known in the art. See, for example, U.S. Pat. No. 4,097,845. In MIA, a suspension comprising of a mixture of particles and liquid is passed under a microscope for analysis. A camera is attached to the microscope and is adapted to image a portion of the suspension. The image of the suspension made by the camera is converted into electrical signal form and is then processed by a computer to determine the select qualities of particles. In order to be able to determine the select qualities of the particles, such as: area, mass density, shape, etc. the boundary of the particle must first be located within the image. Since it is desirable to operate MIA apparatus in automatic mode, i.e., without human intervention, the camera and/or the computer must be smart enough to discern the boundaries of the particles within the field of the view of the image.

In U.S. Pat. No. 4,097,845 a method of locating the boundary of the particle is described using the technique of "neighbors of the neighbors." In the "neighbors of the neighbors" technique, a raster scan is made of the digitized image to locate a pixel having a gray scale above a critical threshold. The four nearest neighbors of the pixel are then analyzed to determine those which have gray scale levels also above the critical threshold. The analysis then proceeds to that pixel which is above the critical threshold and a recursive manner of continuing with four nearest neighbors of pixel are analyzed until the entire region of the particle is defined. Once the entire particle is defined, the boundary is simply the edge of where the particle is defined. An octal chain code is then formed of the boundary. Based upon the octal chain, parameters such as the perimeter of the particle and the area of the particle may be calculated.

U.S. Pat. No. 4,060,713 discloses an apparatus for processing two dimensional data. In that patent, an analysis of the six nearest neighbors of an element is made.

DISCLOSURE OF THE INVENTION

A method and an apparatus is provided for automatically locating the boundary of an object in a field of view. The apparatus has raster scan means for forming an electrical image of the field of view. Means is provided for segmenting the electrical image into a plurality of pixels and for digitizing the image intensity of each pixel into an electrical signal representing the gray scale value to form a first representation of the image. The electrical signal of each of the gray scale value is processed to form a second representation of the image. Logic means converts the second representation into a third representation. The conversion is such that the value of a pixel at a location in the second representation and the values of the nearest adjacent neighbors of that pixel are converted into a single value and stored at the corresponding location (P(X,Y)) in the third representation.

A table means stores various possible values of P(X,Y), whereby the table means receives a value of P(X,Y) and an input direction value and produces an output direction value to indicate the next location of P(X,Y) having a non-zero value, with the non-zero values of P(X,Y) forming the boundary of the object.

BRIEF DESCRIPTION OF THE DRAWINGS

FIG. 1 is a schematic diagram of the apparatus of the present invention.

FIG. 2 is a diagram for the formation of the values of P(X,Y).

FIG. 3 is an example of the conversion of a particle in a second representation, shown in FIG. 3A to a third representation shown in FIG. 3B.

FIG. 4 is a diagram of a convention to describe the direction of travel (theta).

FIG. 5 is a schematic diagram of the function of the Look-Up-Table.

DETAILED DESCRIPTION OF THE DRAWINGS

Referring to FIG. 1, there is shown an apparatus 10 of the present invention. The apparatus 10 comprises a microscope 30 which is focused on an examination area. The examination area may be a slide or may be a flow cell such as that disclosed in U.S. Pat. No. 4,338,024. A camera 34 is attached to the microscope and is adapted to image a portion of a suspension having a particle therein. The camera 34 is preferably of a raster scan type and may be a CCD camera model No. TC1160BD manufactured by RCA. The camera 34 can form an electrical image of the field of view as seen through the microscope 30. Further, the camera 34 segments the electrical image into a plurality of pixels, with an electrical signal corresponding to each pixel of the image.

The apparatus 10 is particularly suited for the examination of biological particles in a fluid, such as urine or blood sample. In addition, the apparatus 10 can also be used for the examination of masks for semiconductor wafers to detect defects therein. Finally, the apparatus 10 can be used to examine a biological specimen in which there is a time variant quality, e.g. tumor growth.

The electrical signals are sent to the digitizer 36. The digitizer 36 digitizes the image intensity of each pixel into an electrical signal representing the gray scale value to form a first representation of the image. Preferably, the pixel is digitized into a gray scale value between 0 and 256.

From the digitizer 36, the gray scale value is entered into a comparator 38. The first representation of the image may also be stored in a first memory 39, a RAM, for convenience in analysis not connected with the present invention. The comparator 38 is used for simple threshhold segmentation. However, other techniques, such as gradient, Laplacian, and other operators, can also be used. A preset threshold is also entered into the comparator 38. The comparator 38 compares the gray scale value of the pixel from digitizer 36 to the pre-set threshold. In the event the gray scale value from the digitizer 36 exceeds the preset threshold, a value of "1" is the result of the comparator 38. In the event the gray scale value from the digitizer 36 is below the preset threshold, a value of "0" is the output of the comparator 38.

The result of this comparison between the pixels of the first representation of the image from the digitizer 36 and the preset threshold is a second representation of the image. The second representation comprises a value of "0" everywhere outside of the boundary of said object and a value of "1" everywhere else. The second representation can be stored in a second memory 40, which may be a RAM. Here again, although there is no need to store the second representation in a memory, for convenience in analysis not connected with the present invention, the second representation may be stored in second memory 40. It should be emphasized that up to this point in the present invention, no large memory planes have been required.

A logic converter 42 takes the second representation of the image as stored in the second memory 40 and converts it into a third representation of the image and stores the third representation of the image in third memory 44. The logic converter 42 takes the second representation and fills a two-line buffer with the incoming data. In this way, the occupancy of any given pixel location and its nearest neighbors are simultaneously available to the converter 42. Although a microprocessor or CPU can be used for this step, standard logic units can also be used. The converter 42 analyzes the value of each pixel within the second representation in the second memory 40. If the value of the pixel at a particular location (X,Y) or pixel (X,Y) is "0" in the second memory 40, then a value of "0" is assigned at the corresponding location P(X,Y) within the third memory 44. If a value of "1" is encountered in the second memory 40 at pixel (X,Y) and if all eight nearest adjacent neighbors of the pixel at (X,Y) are also "0" then the logic converter assigns "0" to P(X,Y). If the value of the pixel (X,Y) is "1" and all four nearest adjacent neighbors of that pixel are also "1", then the logic converter 42 assigns a value of "0" to P(X,Y). In all other events, the logic converter 42 assigns a value to P(X,Y) of:

$$P(X,Y) = a*2^7 + b*2^6 + c*2^5 + d*2^4 + e*2^3 + f*2^2 + g*2 + h$$

where a, b, c, d, e, f, g, h, are the values of the eight nearest neighbors surrounding the corresponding pixel (X,Y) in the following manner:

| g | d | h |
|---|---|---|
| c | pixel (X,Y) | a |
| f | b | e |

These rules to convert the second representation into the third representation may be summarized by the following formula:

$$P(X,Y) = (1-a*b*c*d)*pixel(X,Y)*(a*2^7+b*2^6+c*2^5+d*2^4+e*2^3+f*2^2+g*2+h)$$

where a, b, c, d, e, f, g, h are as previously described.

As previously indicated, while a microprocessor can be employed to carry out the conversion, standard well-known hard wire logic circuits can also be used.

Referring now to FIG. 3A, there is shown an example of a second representation of an image stored in the second mory 40. The logic converter 42 converts each of the value of "0" in the second representation of the image into a value of "0" and stores it into the third memory 44. The second rule of the logic converter, i.e., if the pixel (X,Y) is equal to "1" and all eight nearest neighbors of the pixel (X,Y) equals "0", then a "0" is assigned to the corresponding location (X,Y) in the third memory 44 may be seen by the value of "1" in the lower left hand corner of FIG. 3A. This value is converted to "0" in FIG. 3b according to this rule. This rule eliminates single pixel signals which are presumably to be of noise. Thus, the third representation of the image as stored in the third memory 44 will be free of such noise and errors and the like. The third rule of conversion, i.e., if pixel (X,Y) equals "1" and the four nearest neighbors of pixel (X,Y) equal "1", then a "0" is assigned to the corresponding location in the second memory 44, results in a value of "0" assigned to all points interior of the particle. Thus, in FIG. 3B, the boundary of the particle has non-zero values whereas the interior of that particle is all zeroed out. In this manner, all the non-zero values within the third memory 44 form the boundary of the particle. The interior of the particle, noise, error and the like, have all been filtered out, i.e., assigned a value of "0", in order not to complicate the processing of the determination of the boundary of the particle. Note that the four neighbors immediately adjacent to a location are considered to be closer than the four corner neighbors; i.e., a location must be surrounded by adjacent occupied pixels to be considered an interior point. This convention has a slight effect on counting of voids within an object as discussed below. Finally, the particular manner of converting the second representation into the third representation, i.e. Rule 4, is important because the non-zero value assigned to P(X,Y) indicates not only that the pixel is a boundary pixel but the value of the pixel contains information regarding the location of the adjacent pixels having non-zero values, i.e. the location of the next boundary pixels. In short, information regarding the location of the adjacent boundary pixels are embedded in the value of any pixel, thereby facilitating the formation of a chain to describe the complete boundary of the particle.

From the third memory 44, each value of the pixel is sequentially scanned out until a first non-zero value is encountered. The scanning of the image of the third representation in the third memory 44 occurs from left to right, from top to bottom as in the convention for television scanning. Thus, in FIG. 3B, the value of 76 would be the first pixel read out. The value of the pixel at the particular location where the non-zero value is scanned, and a value of theta are entered into a lookup table 46. Theta is the direction from which the scanning has proceeded in order to arrive at the pixel. The value of theta is stored in a register 60. A convention for denoting the direction of theta is shown in FIG. 4. To start a scan, theta 60 is initially stored a value of 1. The lookup table 46 may be simply a PROM. The PROM 46 takes the non-zero value of the pixel at (X,Y) and the value of theta, and based upon those two pieces of information, generates an output which indicates where the next non-zero value would be found. The next non-zero value would, of course, be the next pixel at which the boundary of the object is located. The output of the lookup table is a value of delta X and delta Y. In the example shown in FIG. 3b, the lookup table would generate a delta X equal to +1, and a delta Y equal −1 to indicate the location of the next non-zero value or the next boundary value of the particle. When delta X equal to +1 and delta Y equal to −1 from the value of 76, the location would turn to the value of 110 as shown in FIG. 3b. The exact mechanism of the lookup table 46 will be discussed hereinafter.

Since the lookup table 46 generates a change in the X address and a change in the Y address, these values are entered into an X addressor 48 and a Y addressor 50 respectively. The X addressor 48 and the Y addressor 50 then proceed to the next location within the third memory 44. At the same time, the values from X addressor 48 and the Y addressor 50, are supplied to a theta value calculator 52. The stored value of theta from theta 60 is also supplied to the theta calculator 52. Theta calculator 52 may be another PROM and contains another table which generates a new value of theta and stores it in theta 60, based upon delta X, delta Y and the old value of theta from theta 60. In this manner, as shown in FIG. 3b, from the boundary value of 76 to the boundary value of 110, delta X equal to +1 delta Y equal to −1, would result in a theta equal to 7 as shown by the convention of theta direction in FIG. 4. At the same time that the lookup table 46 generates a change in X and a change in Y addresses, an octal chain is formed by the chaining code 54. The chaining code 54 forming the octal chain is well known and is fully described in U.S. Pat. No. 4,097,845. Finally, the value from which the third representation as shown in third memory 44 was taken in generating the values of delta X and delta Y from the lookup table 46, is then replaced by a value of "0" taken from the first two hexadecimal numbers of the appropriate entry in the table on Appendix A. In other words, for example, as shown in FIG. 3b, once the non-zero value of the boundary is read out, it is replaced by a "0" value in order to insure that that non-zero value is read only once. Thus, the number 76 is replaced with the number "0" when the X addressor 48 and the Y addressor 50 reaches the location where the value of 110 is located.

Many cases are not as simple as this example. A given pixel might serve as both sides of a long narrow object, or an object might contain a void close to the outer edge such that only one pixel serves as both the inner and outer edge boundary. In these cases, the value loaded back into the storage is not 0, but another value which represents all permitted paths to leave that location, except for the one just chosen. That is, everytime an edge is traced through a given location, one of the possible paths out of it is erased. This proceeds until the location contains a 0 as in the example above. The lookup table contains all necessary information to make these substitutions without further calculations. In this way, objects of arbitrary shape can be described. These conventions imply that objects are traced in one direction (counterclockwise in the present implementation) and voids within objects are traced in the opposite direction. This aids in identifying voids since areas calculated from these conventions will be positive for objects, and negative for voids. When tracing voids, the connectivity of diagonal locations is less than for objects because of the distance convention mentioned above. Thus diagonal locations of voids are not considered to be touching. Another difference betweeen voids and objects is that by the convention given above, a valid void can consist of single pixel. This feature is useful in characterising the interior structure of objects.

A copy of the lookup table 46 is attached herewith as Appendix A. Because the value of the third representation of the image as stored in the third memory 44 at any particular location is a number composed of the values of the eight nearest neighbors of that location, the conversion of the image from the second representation into the third representation thereby embeds information relating to the location of the next non-zero boundary value. In other words, for example, with the number 76 as shown in FIG. 3b, with the convention of the manner of generating the number 76 as shown in FIG. 2, it is known by the lookup table 46 that the value of 76 indicates that positions f, b, and e relative thereto (the convention as denoted in FIG. 2), will have non-zero values of the pixel. Furthermore, with the knowledge of the value of theta, i.e., the direction of travel to arrive at the pixel location, the lookup table 46 will generate the next possible location for the boundary. In short, with the convention as shown and as described in FIG. 2 with regard to the generation of the third representation of the image as stored in third memory 44, the generation of the pixel value itself creates a value which has embedded therein information regarding the next possible non-zero boundary values adjacent to the pixel location. With the further knowledge of the direction of travel as provided by theta, the lookup table 46 provides a direction of travel in order to arrive at the next non-zero boundary value. Therefore, by the choice of the selection of the conversion of the second representation into the third representation, information regarding the adjacent boundary pixel is then encoded and embedded in the value of the pixel at the particular location. This facilitates the location of the pixels that form the boundary of the image and thereby forming the octal chain in order to locate the image for further processing, such as a determination of perimeter, area, and optical density and the like. In order to facilitate the determination of the next boundary pixel, the look up table is comprised of all possible values of P(X,Y) with all possible values of delta X and delta Y values. These values are precalculated and stored in a PROM to permit rapid formation of the chain code.

The lookup table shown on Appendix A is encoded in hexadecimal. The least significant hexadecimal digit (the rightmost digit) is a four digit binary number. (A four digit binary number equals one hexadecimal digit.) The four digit binary number is composed of two binary digits for delta X and two binary digits for delta Y. If the two digit binary number is:

00 this represents delta (X or Y) of 0
01 this represents delta (X or Y) of +1
11 this represents delta (X or Y) of −1
10 not used However, the combination 1000 is used to represent error condition.

As previously stated, the theta calculator 52 may be simply another look-up table in the form of a PROM. A copy of the table is attached herewith as Appendix B. The values of theta in the leftmost vertical column are the values of theta from theta 60. The values of "8, 9, A, B, C, D, E, F" are redundant values in that theta can never be these values. Thus, all the outputs of "1" from this portion of the Table are not possible values. The values of delta X and delta Y are set forth horizontally. Only certain possible values of delta X and delta Y are set forth; namely, each can only be "0" or "+1" or "−1". The new theta to be stored in theta 60 is derived by reading from the appropriate column and row. A value of "8" shows an error condition.

To illustrate, the number 76 (shown in FIG. 3b) is first encountered, with theta 60 stored initially as 1. From Appendix A, the number of 007 is generated by the lookup table 46. The least significant hexadecimal digit 7 is equal to 0111 in binary. Delta X is "01" which is +1; while delta Y is "11" which is −1.

Based upon delta X equals to +1, delta Y equals to −1, and theta 60 equal to 1, a value of theta of 7 is generated by the theta calculator 52 and is stored in theta 60. X-addressor 48 and Y addressor 50 then advance to a location in memory 44 where the value of 110 is reached. The value of 110 (P(X,Y)) from memory 44 and 7(theta) from theta 60 are supplied to Table 46. From Appendix A, a number of 007 is generated. The hexadecimal digit 7 equals 0111 in binary. Delta X is "01" which is +1; while delta Y is "11" which is −1.

From the theta calculator 52, a theta of 7 is generated based upon delta X=+1, delta Y=−1 and theta 60=7. The X and Y addressors 48 and 50 advance to the location in memory 44 where the next value of P(X,Y) 102 is encountered. Based upon Appendix A, a number 003 is then generated from the look-up table 46. The binary equivalent is 0011. Thus, delta X equals 0 and delta Y equals −1.

Theta calculator 52 takes delta X=0, delta Y=−1, theta 60=7 and generates a theta of 6 and stores it in theta 60.

The next number retrieved from Memory 44 based upon the above values of delta X and delta Y would be 118. Theta 60 is now 6. From Appendix A, 003 is generated. This directs delta X to 0 and delta Y to −1.

Based upon the values of delta X and delta Y, the next number retired is 50, shown in FIG. 3b. Theta is calculated to be 6. From Appendix A, the hexadecimal OOC is generated. This corresponds to the binary number 1100, with delta X equal to 11 and delta Y equal to 00. The values of delta X and delta Y are −1 and 0, respectively. This then leads to the location in FIG. 3b with value of 179.

This process continues until all locations of the boundary of the particle shown in FIG. 3b have been identified.

As can be seen from the foregoing example, the direction to the next boundary pixel is embedded in the value of the pixel.

As previously stated, the logic converter 42, may be part of a computer, such as an Intel 80/20 computer. In addition, the chain code calculator 54, the theta calculator 52, the X addressor 48 and the Y addressor 50 may also be part of the same computer.

Appendix A

|    | 0   | 1   | 2   | 3   | 4   | 5   | 6   | 7   |
|----|-----|-----|-----|-----|-----|-----|-----|-----|
| 0  | 008 | 008 | 008 | 008 | 008 | 008 | 008 | 008 |
| 1  | 005 | 005 | 005 | 005 | 008 | 005 | 008 | 005 |
| 2  | 008 | 00D | 00D | 00D | 00D | 00D | 008 | 00D |
| 3  | 008 | 01D | 01D | 01D | 008 | 01D | 008 | 025 |
| 4  | 008 | 00F | 008 | 00F | 00F | 00F | 00F | 00F |
| 5  | 045 | 045 | 008 | 01F | 01F | 01F | 008 | 045 |
| 6  | 008 | 04D | 008 | 02F | 02F | 02F | 008 | 02F |
| 7  | 008 | 05D | 008 | 03F | 008 | 03F | 008 | 065 |
| 8  | 007 | 007 | 008 | 007 | 008 | 007 | 007 | 007 |
| 9  | 085 | 085 | 008 | 085 | 008 | 017 | 008 | 085 |
| 10 | 008 | 08D | 08D | 08D | 008 | 027 | 027 | 027 |
| 11 | 008 | 09D | 008 | 09D | 008 | 037 | 008 | 0A5 |
| 12 | 008 | 047 | 008 | 08F | 008 | 047 | 047 | 047 |
| 13 | 008 | 0C5 | 008 | 09F | 008 | 057 | 008 | 0C5 |
| 14 | 008 | 0CD | 008 | 0AF | 008 | 067 | 008 | 067 |
| 15 | 008 | 0DD | 008 | 0BF | 008 | 077 | 008 | 0E5 |
| 16 | 008 | 001 | 001 | 001 | 008 | 008 | 001 | 008 |
| 17 | 008 | 008 | 008 | 008 | 008 | 001 | 008 | 008 |
| 18 | 008 | 008 | 008 | 008 | 008 | 008 | 00D | 008 |
| 19 | 008 | 008 | 008 | 008 | 008 | 00D | 008 | 008 |
| 20 | 008 | 041 | 008 | 10F | 008 | 008 | 10F | 008 |
| 21 | 008 | 041 | 008 | 008 | 008 | 10F | 008 | 008 |
| 22 | 008 | 04D | 008 | 008 | 008 | 008 | 02F | 008 |
| 23 | 008 | 04D | 008 | 008 | 008 | 02F | 008 | 008 |
| 24 | 008 | 081 | 008 | 081 | 008 | 107 | 107 | 008 |
| 25 | 008 | 008 | 008 | 081 | 008 | 107 | 008 | 008 |
| 26 | 008 | 008 | 008 | 08D | 008 | 008 | 027 | 008 |
| 27 | 008 | 008 | 008 | 08D | 008 | 027 | 008 | 008 |
| 28 | 008 | 0C1 | 008 | 18F | 008 | 008 | 147 | 008 |
| 29 | 008 | 0C1 | 008 | 18F | 008 | 147 | 008 | 008 |
| 30 | 008 | 0CD | 008 | 0AF | 008 | 008 | 067 | 008 |
| 31 | 008 | 0CD | 008 | 0AF | 008 | 067 | 008 | 008 |
| 32 | 00C | 008 | 008 | 00C | 00C | 00C | 008 | 008 |

| | | | | | | | | |
|---|---|---|---|---|---|---|---|---|
| 33 | 205 | 008 | 008 | 01C | 008 | 01C | 008 | 205 |
| 34 | 008 | 008 | 008 | 008 | 008 | 008 | 008 | 00C |
| 35 | 008 | 008 | 008 | 008 | 008 | 01C | 008 | 205 |
| 36 | 00F | 008 | 008 | 008 | 008 | 008 | 008 | 008 |
| 37 | 045 | 008 | 008 | 008 | 008 | 01F | 008 | 008 |
| 38 | 008 | 008 | 008 | 008 | 008 | 008 | 008 | 00F |
| 39 | 008 | 008 | 008 | 008 | 008 | 01F | 008 | 045 |
| 40 | 207 | 008 | 008 | 08C | 008 | 207 | 008 | 008 |
| 41 | 285 | 008 | 008 | 09C | 008 | 217 | 008 | 008 |
| 42 | 008 | 008 | 008 | 08C | 008 | 008 | 008 | 207 |
| 43 | 008 | 008 | 008 | 09C | 008 | 217 | 008 | 285 |
| 44 | 047 | 00F | 008 | 08F | 008 | 008 | 008 | 008 |
| 45 | 0C5 | 00F | 008 | 09F | 008 | 057 | 008 | 008 |
| 46 | 008 | 00F | 008 | 08F | 008 | 008 | 008 | 047 |
| 47 | 008 | 00F | 008 | 09F | 008 | 057 | 008 | 0C5 |
| 48 | 008 | 008 | 008 | 008 | 008 | 008 | 00C | 008 |
| 49 | 008 | 008 | 008 | 008 | 008 | 00C | 008 | 008 |
| 50 | 008 | 008 | 008 | 008 | 008 | 008 | 00C | 008 |
| 51 | 008 | 008 | 008 | 008 | 008 | 00C | 008 | 008 |
| 52 | 008 | 008 | 008 | 008 | 008 | 008 | 00F | 008 |
| 53 | 008 | 008 | 008 | 008 | 008 | 00F | 008 | 008 |
| 54 | 008 | 008 | 008 | 008 | 008 | 008 | 00F | 008 |
| 55 | 008 | 008 | 008 | 008 | 008 | 00F | 008 | 008 |
| 56 | 008 | 008 | 008 | 08C | 008 | 008 | 207 | 008 |
| 57 | 008 | 008 | 008 | 08C | 008 | 207 | 008 | 008 |
| 58 | 008 | 008 | 008 | 08C | 008 | 008 | 207 | 008 |
| 59 | 008 | 008 | 008 | 08C | 008 | 207 | 008 | 008 |
| 60 | 008 | 00F | 008 | 08F | 008 | 008 | 047 | 008 |
| 61 | 008 | 00F | 008 | 08F | 008 | 047 | 008 | 008 |
| 62 | 008 | 00F | 008 | 08F | 008 | 008 | 047 | 008 |
| 63 | 008 | 00F | 008 | 08F | 008 | 047 | 008 | 008 |
| 64 | 008 | 003 | 003 | 008 | 008 | 003 | 003 | 003 |
| 65 | 008 | 008 | 405 | 008 | 008 | 013 | 008 | 405 |
| 66 | 008 | 40D | 40D | 008 | 008 | 023 | 008 | 023 |
| 67 | 008 | 008 | 41D | 008 | 008 | 033 | 008 | 425 |
| 68 | 008 | 003 | 008 | 008 | 008 | 008 | 008 | 008 |
| 69 | 008 | 405 | 008 | 008 | 008 | 013 | 008 | 008 |
| 70 | 008 | 40D | 008 | 008 | 008 | 008 | 008 | 023 |
| 71 | 008 | 41D | 008 | 008 | 008 | 033 | 008 | 425 |
| 72 | 008 | 007 | 007 | 008 | 008 | 008 | 008 | 008 |
| 73 | 008 | 008 | 085 | 008 | 008 | 017 | 008 | 008 |
| 74 | 008 | 008 | 08D | 008 | 008 | 008 | 008 | 027 |
| 75 | 008 | 008 | 09D | 008 | 008 | 037 | 008 | 0A5 |
| 76 | 008 | 007 | 008 | 008 | 008 | 008 | 008 | 008 |
| 77 | 008 | 085 | 008 | 008 | 008 | 017 | 008 | 008 |
| 78 | 008 | 08D | 008 | 008 | 008 | 008 | 008 | 027 |
| 79 | 008 | 09D | 008 | 008 | 008 | 037 | 008 | 0A5 |
| 80 | 008 | 008 | 401 | 008 | 008 | 008 | 103 | 008 |
| 81 | 008 | 008 | 401 | 008 | 008 | 103 | 008 | 008 |
| 82 | 008 | 008 | 40D | 008 | 008 | 008 | 023 | 008 |
| 83 | 008 | 008 | 40D | 008 | 008 | 023 | 008 | 008 |
| 84 | 008 | 401 | 008 | 008 | 008 | 008 | 103 | 008 |
| 85 | 008 | 401 | 008 | 008 | 008 | 103 | 008 | 008 |
| 86 | 008 | 40D | 008 | 008 | 008 | 008 | 023 | 008 |
| 87 | 008 | 40D | 008 | 008 | 008 | 023 | 008 | 008 |
| 88 | 008 | 008 | 081 | 008 | 008 | 008 | 107 | 008 |
| 89 | 008 | 008 | 081 | 008 | 008 | 107 | 008 | 008 |
| 90 | 008 | 008 | 08D | 008 | 008 | 008 | 027 | 008 |
| 91 | 008 | 008 | 08D | 008 | 008 | 027 | 008 | 008 |
| 92 | 008 | 081 | 008 | 008 | 008 | 008 | 107 | 008 |
| 93 | 008 | 081 | 008 | 008 | 008 | 107 | 008 | 008 |

| | | | | | | | | |
|---|---|---|---|---|---|---|---|---|
| 94 | 008 | 08D | 008 | 008 | 008 | 008 | 027 | 008 |
| 95 | 008 | 08D | 008 | 008 | 008 | 027 | 008 | 008 |
| 96 | 003 | 008 | 008 | 008 | 008 | 008 | 008 | 008 |
| 97 | 405 | 008 | 008 | 008 | 008 | 013 | 008 | 008 |
| 98 | 008 | 008 | 008 | 008 | 008 | 008 | 008 | 003 |
| 99 | 008 | 008 | 008 | 008 | 008 | 013 | 008 | 405 |
| 100 | 003 | 008 | 008 | 008 | 008 | 008 | 008 | 008 |
| 101 | 405 | 008 | 008 | 008 | 008 | 013 | 008 | 008 |
| 102 | 008 | 008 | 008 | 008 | 008 | 008 | 008 | 003 |
| 103 | 008 | 008 | 008 | 008 | 008 | 013 | 008 | 405 |
| 104 | 007 | 008 | 008 | 008 | 008 | 008 | 008 | 008 |
| 105 | 085 | 008 | 008 | 008 | 008 | 017 | 008 | 008 |
| 106 | 008 | 008 | 008 | 008 | 008 | 008 | 008 | 007 |
| 107 | 008 | 008 | 008 | 008 | 008 | 017 | 008 | 085 |
| 108 | 007 | 008 | 008 | 008 | 008 | 008 | 008 | 008 |
| 109 | 085 | 008 | 008 | 008 | 008 | 017 | 008 | 008 |
| 110 | 008 | 008 | 008 | 008 | 008 | 008 | 008 | 007 |
| 111 | 008 | 008 | 008 | 008 | 008 | 017 | 008 | 085 |
| 112 | 008 | 008 | 008 | 008 | 008 | 008 | 003 | 008 |
| 113 | 008 | 008 | 008 | 008 | 008 | 008 | 003 | 008 |
| 114 | 008 | 008 | 008 | 008 | 008 | 008 | 003 | 008 |
| 115 | 008 | 008 | 008 | 008 | 008 | 008 | 003 | 008 |
| 116 | 008 | 008 | 008 | 008 | 008 | 008 | 003 | 008 |
| 117 | 008 | 008 | 008 | 008 | 008 | 003 | 008 | 008 |
| 118 | 008 | 008 | 008 | 008 | 008 | 003 | 008 | 008 |
| 119 | 008 | 008 | 008 | 008 | 008 | 003 | 008 | 008 |
| 120 | 008 | 008 | 008 | 008 | 008 | 003 | 008 | 008 |
| 121 | 008 | 008 | 008 | 008 | 008 | 008 | 007 | 008 |
| 122 | 008 | 008 | 008 | 008 | 008 | 008 | 007 | 008 |
| 123 | 008 | 008 | 008 | 008 | 008 | 008 | 007 | 008 |
| 124 | 008 | 008 | 008 | 008 | 008 | 008 | 007 | 008 |
| 125 | 008 | 008 | 008 | 008 | 008 | 007 | 008 | 008 |
| 126 | 008 | 008 | 008 | 008 | 008 | 007 | 008 | 008 |
| 127 | 008 | 008 | 008 | 008 | 008 | 007 | 008 | 008 |
| 128 | 004 | 004 | 008 | 008 | 004 | 008 | 008 | 004 |
| 129 | 008 | 008 | 008 | 008 | 005 | 008 | 008 | 008 |
| 130 | 008 | 80D | 008 | 008 | 80D | 008 | 008 | 024 |
| 131 | 008 | 008 | 008 | 008 | 01D | 008 | 008 | 025 |
| 132 | 008 | 044 | 008 | 80F | 80F | 008 | 008 | 044 |
| 133 | 008 | 045 | 008 | 008 | 01F | 008 | 008 | 008 |
| 134 | 008 | 84D | 008 | 008 | 82F | 008 | 008 | 064 |
| 135 | 008 | 05D | 008 | 008 | 03F | 008 | 008 | 065 |
| 136 | 008 | 004 | 008 | 004 | 008 | 008 | 008 | 008 |
| 137 | 008 | 008 | 008 | 005 | 008 | 008 | 008 | 008 |
| 138 | 008 | 008 | 008 | 80D | 008 | 008 | 008 | 024 |
| 139 | 008 | 008 | 008 | 01D | 008 | 008 | 008 | 025 |
| 140 | 008 | 044 | 008 | 80F | 008 | 008 | 008 | 008 |
| 141 | 008 | 045 | 008 | 01F | 008 | 008 | 008 | 008 |
| 142 | 008 | 84D | 008 | 82F | 008 | 008 | 008 | 064 |
| 143 | 008 | 05D | 008 | 03F | 008 | 008 | 008 | 065 |
| 144 | 008 | 008 | 008 | 008 | 001 | 008 | 008 | 008 |
| 145 | 008 | 008 | 008 | 008 | 001 | 008 | 008 | 008 |
| 146 | 008 | 008 | 008 | 008 | 00D | 008 | 008 | 008 |
| 147 | 008 | 008 | 008 | 008 | 00D | 008 | 008 | 008 |
| 148 | 008 | 041 | 008 | 008 | 10F | 008 | 008 | 008 |
| 149 | 008 | 041 | 008 | 008 | 10F | 008 | 008 | 008 |
| 150 | 008 | 04D | 008 | 008 | 02F | 008 | 008 | 008 |
| 151 | 008 | 04D | 008 | 008 | 02F | 008 | 008 | 008 |
| 152 | 008 | 008 | 008 | 001 | 008 | 008 | 008 | 008 |
| 153 | 008 | 008 | 008 | 001 | 008 | 008 | 008 | 008 |
| 154 | 008 | 008 | 008 | 00D | 008 | 008 | 008 | 008 |

| | | | | | | | | |
|---|---|---|---|---|---|---|---|---|
| 155 | 008 | 008 | 008 | 00D | 008 | 008 | 008 | 008 |
| 156 | 008 | 041 | 008 | 10F | 008 | 008 | 008 | 008 |
| 157 | 008 | 041 | 008 | 10F | 008 | 008 | 008 | 008 |
| 158 | 008 | 04D | 008 | 02F | 008 | 008 | 008 | 008 |
| 159 | 008 | 04D | 008 | 02F | 008 | 008 | 008 | 008 |
| 160 | 204 | 008 | 008 | 008 | 80C | 008 | 008 | 008 |
| 161 | 205 | 008 | 008 | 008 | 01C | 008 | 008 | 008 |
| 162 | 008 | 008 | 008 | 008 | 80C | 008 | 008 | 204 |
| 163 | 008 | 008 | 008 | 008 | 01C | 008 | 008 | 205 |
| 164 | 044 | 00F | 008 | 008 | 80F | 008 | 008 | 008 |
| 165 | 045 | 00F | 008 | 008 | 01F | 008 | 008 | 008 |
| 166 | 008 | 00F | 008 | 008 | 80F | 008 | 008 | 044 |
| 167 | 008 | 00F | 008 | 008 | 01F | 008 | 008 | 045 |
| 168 | 204 | 008 | 008 | 80C | 008 | 008 | 008 | 008 |
| 169 | 205 | 008 | 008 | 01C | 008 | 008 | 008 | 008 |
| 170 | 008 | 008 | 008 | 80C | 008 | 008 | 008 | 204 |
| 171 | 008 | 008 | 008 | 01C | 008 | 008 | 008 | 205 |
| 172 | 044 | 00F | 008 | 80F | 008 | 008 | 008 | 008 |
| 173 | 045 | 00F | 008 | 01F | 008 | 008 | 008 | 008 |
| 174 | 008 | 00F | 008 | 80F | 008 | 008 | 008 | 044 |
| 175 | 008 | 00F | 008 | 01F | 008 | 008 | 008 | 045 |
| 176 | 008 | 008 | 008 | 008 | 00C | 008 | 008 | 008 |
| 177 | 008 | 008 | 008 | 008 | 00C | 008 | 008 | 008 |
| 178 | 008 | 008 | 008 | 008 | 00C | 008 | 008 | 008 |
| 179 | 008 | 008 | 008 | 008 | 00C | 008 | 008 | 008 |
| 180 | 008 | 00F | 008 | 008 | 00F | 008 | 008 | 008 |
| 181 | 008 | 00F | 008 | 008 | 00F | 008 | 008 | 008 |
| 182 | 008 | 00F | 008 | 008 | 00F | 008 | 008 | 008 |
| 183 | 008 | 00F | 008 | 008 | 00F | 008 | 008 | 008 |
| 184 | 008 | 008 | 008 | 00C | 008 | 008 | 008 | 008 |
| 185 | 008 | 008 | 008 | 00C | 008 | 008 | 008 | 008 |
| 186 | 008 | 008 | 008 | 00C | 008 | 008 | 008 | 008 |
| 187 | 008 | 008 | 008 | 00C | 008 | 008 | 008 | 008 |
| 188 | 008 | 00F | 008 | 00F | 008 | 008 | 008 | 008 |
| 189 | 008 | 00F | 008 | 00F | 008 | 008 | 008 | 008 |
| 190 | 008 | 00F | 008 | 00F | 008 | 008 | 008 | 008 |
| 191 | 008 | 00F | 008 | 00F | 008 | 008 | 008 | 008 |
| 192 | 008 | 004 | 004 | 008 | 008 | 008 | 008 | 008 |
| 193 | 008 | 008 | 005 | 008 | 008 | 008 | 008 | 008 |
| 194 | 008 | 008 | 80D | 008 | 008 | 008 | 008 | 024 |
| 195 | 008 | 008 | 01D | 008 | 008 | 008 | 008 | 025 |
| 196 | 008 | 004 | 008 | 008 | 008 | 008 | 008 | 008 |
| 197 | 008 | 005 | 008 | 008 | 008 | 008 | 008 | 008 |
| 198 | 008 | 80D | 008 | 008 | 008 | 008 | 008 | 024 |
| 199 | 008 | 01D | 008 | 008 | 008 | 008 | 008 | 025 |
| 200 | 008 | 004 | 004 | 008 | 008 | 008 | 008 | 008 |
| 201 | 008 | 008 | 005 | 008 | 008 | 008 | 008 | 008 |
| 202 | 008 | 008 | 80D | 008 | 008 | 008 | 008 | 024 |
| 203 | 008 | 008 | 01D | 008 | 008 | 008 | 008 | 025 |
| 204 | 008 | 004 | 008 | 008 | 008 | 008 | 008 | 008 |
| 205 | 008 | 005 | 008 | 008 | 008 | 008 | 008 | 008 |
| 206 | 008 | 80D | 008 | 008 | 008 | 008 | 008 | 024 |
| 207 | 008 | 01D | 008 | 008 | 008 | 008 | 008 | 025 |
| 208 | 008 | 008 | 001 | 008 | 008 | 008 | 008 | 008 |
| 209 | 008 | 008 | 001 | 008 | 008 | 008 | 008 | 008 |
| 210 | 008 | 008 | 00D | 008 | 008 | 008 | 008 | 008 |
| 211 | 008 | 008 | 00D | 008 | 008 | 008 | 008 | 008 |
| 212 | 008 | 001 | 008 | 008 | 008 | 008 | 008 | 008 |
| 213 | 008 | 001 | 008 | 008 | 008 | 008 | 008 | 008 |
| 214 | 008 | 00D | 008 | 008 | 008 | 008 | 008 | 008 |
| 215 | 008 | 00D | 008 | 008 | 008 | 008 | 008 | 008 |
| 216 | 008 | 008 | 001 | 008 | 008 | 008 | 008 | 008 |

| | | | | | | | | |
|---|---|---|---|---|---|---|---|---|
| 217 | 008 | 008 | 001 | 008 | 008 | 008 | 008 | 008 |
| 218 | 008 | 008 | 00D | 008 | 008 | 008 | 008 | 008 |
| 219 | 008 | 008 | 00D | 008 | 008 | 008 | 008 | 008 |
| 220 | 008 | 001 | 008 | 008 | 008 | 008 | 008 | 008 |
| 221 | 008 | 001 | 008 | 008 | 008 | 008 | 008 | 008 |
| 222 | 008 | 00D | 008 | 008 | 008 | 008 | 008 | 008 |
| 223 | 008 | 00D | 008 | 008 | 008 | 008 | 008 | 008 |
| 224 | 004 | 008 | 008 | 008 | 008 | 008 | 008 | 008 |
| 225 | 005 | 008 | 008 | 008 | 008 | 008 | 008 | 008 |
| 226 | 008 | 008 | 008 | 008 | 008 | 008 | 008 | 008 |
| 227 | 008 | 008 | 008 | 008 | 008 | 008 | 008 | 004 |
| 228 | 004 | 008 | 008 | 008 | 008 | 008 | 008 | 005 |
| 229 | 005 | 008 | 008 | 008 | 008 | 008 | 008 | 008 |
| 230 | 008 | 008 | 008 | 008 | 008 | 008 | 008 | 004 |
| 231 | 008 | 008 | 008 | 008 | 008 | 008 | 008 | 005 |
| 232 | 004 | 008 | 008 | 008 | 008 | 008 | 008 | 008 |
| 233 | 005 | 008 | 008 | 008 | 008 | 008 | 008 | 008 |
| 234 | 008 | 008 | 008 | 008 | 008 | 008 | 008 | 004 |
| 235 | 008 | 008 | 008 | 008 | 008 | 008 | 008 | 005 |
| 236 | 004 | 008 | 008 | 008 | 008 | 008 | 008 | 008 |
| 237 | 005 | 008 | 008 | 008 | 008 | 008 | 008 | 008 |
| 238 | 008 | 008 | 008 | 008 | 008 | 008 | 008 | 004 |
| 239 | 008 | 008 | 008 | 008 | 008 | 008 | 008 | 005 |
| 240 | 008 | 008 | 008 | 008 | 008 | 008 | 008 | 008 |
| 241 | 008 | 008 | 008 | 008 | 008 | 008 | 008 | 008 |
| 242 | 008 | 008 | 008 | 008 | 008 | 008 | 008 | 008 |
| 243 | 008 | 008 | 008 | 008 | 008 | 008 | 008 | 008 |
| 244 | 008 | 008 | 008 | 008 | 008 | 008 | 008 | 008 |
| 245 | 008 | 008 | 008 | 008 | 008 | 008 | 008 | 008 |
| 246 | 008 | 008 | 008 | 008 | 008 | 008 | 008 | 008 |
| 247 | 008 | 008 | 008 | 008 | 008 | 008 | 008 | 008 |
| 248 | 008 | 008 | 008 | 008 | 008 | 008 | 008 | 008 |
| 249 | 008 | 008 | 008 | 008 | 008 | 008 | 008 | 008 |
| 250 | 008 | 008 | 008 | 008 | 008 | 008 | 008 | 008 |
| 251 | 008 | 008 | 008 | 008 | 008 | 008 | 008 | 008 |
| 252 | 008 | 008 | 008 | 008 | 008 | 008 | 008 | 008 |
| 253 | 008 | 008 | 008 | 008 | 008 | 008 | 008 | 008 |
| 254 | 008 | 008 | 008 | 008 | 008 | 008 | 008 | 008 |
| 255 | 008 | 008 | 008 | 008 | 008 | 008 | 008 | 008 |

Appendix B

| theta | $\Delta X=0$ $\Delta Y=+1$ | $\Delta X=0$ $\Delta Y=-1$ | $\Delta X=+1$ $\Delta Y=0$ | $\Delta X=+1$ $\Delta Y=+1$ | $\Delta X=+1$ $\Delta Y=-1$ | | | | $\Delta X=-1$ $\Delta Y=0$ | $\Delta X=-1$ $\Delta Y=+1$ | $\Delta X=-1$ $\Delta Y=-1$ |
|---|---|---|---|---|---|---|---|---|---|---|---|
| 0 | 8 | 8 | 8 | 6 | 0 | 1 | 8 | 7 | 8 | 8 | 8 | 8 | 4 | 8 | 8 | 5 |
| 1 | 8 | 2 | 8 | 6 | 0 | 1 | 8 | 7 | 8 | 8 | 8 | 8 | 8 | 3 | 8 | 5 |
| 2 | 8 | 2 | 8 | 6 | 0 | 1 | 8 | 7 | 8 | 8 | 8 | 8 | 8 | 3 | 8 | 8 |
| 3 | 8 | 2 | 8 | 8 | 0 | 1 | 8 | 7 | 8 | 8 | 8 | 8 | 4 | 3 | 8 | 5 |
| 4 | 8 | 2 | 8 | 8 | 0 | 1 | 8 | 8 | 8 | 8 | 8 | 8 | 4 | 3 | 8 | 5 |
| 5 | 8 | 2 | 8 | 6 | 8 | 1 | 8 | 7 | 8 | 8 | 8 | 8 | 4 | 3 | 8 | 5 |
| 6 | 8 | 2 | 8 | 6 | 8 | 8 | 8 | 7 | 8 | 8 | 8 | 8 | 4 | 3 | 8 | 5 |
| 7 | 8 | 8 | 8 | 6 | 0 | 1 | 8 | 7 | 8 | 8 | 8 | 8 | 4 | 3 | 8 | 5 |
| 8 | 1 | 1 | 1 | 1 | 1 | 1 | 1 | 1 | 1 | 1 | 1 | 1 | 1 | 1 | 1 | 1 |
| 9 | 1 | 1 | 1 | 1 | 1 | 1 | 1 | 1 | 1 | 1 | 1 | 1 | 1 | 1 | 1 | 1 |
| A | 1 | 1 | 1 | 1 | 1 | 1 | 1 | 1 | 1 | 1 | 1 | 1 | 1 | 1 | 1 | 1 |
| B | 1 | 1 | 1 | 1 | 1 | 1 | 1 | 1 | 1 | 1 | 1 | 1 | 1 | 1 | 1 | 1 |
| C | 1 | 1 | 1 | 1 | 1 | 1 | 1 | 1 | 1 | 1 | 1 | 1 | 1 | 1 | 1 | 1 |
| D | 1 | 1 | 1 | 1 | 1 | 1 | 1 | 1 | 1 | 1 | 1 | 1 | 1 | 1 | 1 | 1 |
| E | 1 | 1 | 1 | 1 | 1 | 1 | 1 | 1 | 1 | 1 | 1 | 1 | 1 | 1 | 1 | 1 |
| F | 1 | 1 | 1 | 1 | 1 | 1 | 1 | 1 | 1 | 1 | 1 | 1 | 1 | 1 | 1 | 1 |

What is claimed is:

1. An apparatus for automatically locating the boundary of an object in a field of view, said apparatus comprising:

imaging means for forming an electrical image of the field of view;

means for forming a first representation of said image by segmenting said image into a plurality of pixels and digitizing the image intensity of each pixel into an electrical signal representing the greyscale value;

means for processing the electrical signal of each of said greyscale value to form a second representation of said image;

logic means for converting said second representation into a third representation whereby the value of a pixel at a location (hereinafter: pixel (X,Y)) in the second representation and the values of the nearest adjacent neighbors of said pixel at said location are converted into a single value at said corresponding location (hereinafter: P(X,Y)) in said third representation;

storage means for storing said third representation; and table means for storing various possible values of P(X,Y), said table means for receiving a value of P(X,Y) and an input direction value, and for producing an output direction value to indicate the next location of P(X,Y) having a non-zero value; said non-zero values of P(X,Y) form the boundary of said object.

2. The apparatus of claim 1 wherein said logic means is adapted to convert said second representation in accordance with the following rules:

(1) If pixel (X,Y)=0, then assign 0 to P(X,Y);
(2) If pixel (X,Y)=1 and all eight nearest neighbors of pixel (X,Y)=0, then assign 0 to P(X,Y);
(3) If pixel (X,Y)=1 and all four nearest neighbors of pixel (X,Y)=1, then assign 0 to P(X,Y);
(4) Otherwise assign a non-zero value to P(X,Y) wherein said value assigned to P(X,Y) is a number composed of the values of the eight nearest neighbors of pixel (X,Y).

3. The apparatus of claim 2 wherein said value assigned to P(X,Y) is a number whose value is the sum:

$$a*2^7+b*2^6+c*2^5+d*2^4+e*2^3+f*2^2+g*2+h$$

where a, b, c, d, e, f, g, h are the values of eight nearest neighbors surrounding the corresponding pixel (X,Y) in the following manner:

| g | d | h |
|---|---|---|
| c | pixel (X,Y) | a |
| f | b | e |

4. The apparatus of claim 3 wherein said logic means converts said second representation in accordance with the following formula:

$$P(X,Y)=(1-a*b*c*d)*pixel(X,Y)*$$
$$(a*2^7+b*2^6+c*2^5+d*2^4+e*2^3+f*2^2+g*2+h).$$

5. The apparatus of claim 4 wherein said table means is a PROM.

6. The apparatus of claim 1 wherein said second representation consists of a value of "0" everywhere outside of the boundary of said object and a value of "1" everywhere else.

7. The apparatus of claim 6 wherein said processing means comprises
means for comparing the greyscale of each pixel with a preset threshold value.

8. The apparatus of claim 1 wherein said object is a biological particle in a fluid.

9. The apparatus of claim 8 wherein said fluid is urine.

10. The apparatus of claim 8 wherein said fluid is blood.

11. The apparatus of claim 1 wherein said object is a pattern for a semiconductor circuit.

12. The apparatus of claim 1 wherein said object is a biological particle having a time variant quality.

13. A method for automatically locating the boundary of an object in a field of view and filtering out noise, error and the like, said method comprising:

forming an electrical image of said field of view in a device;

reading out said image from said device to produce an electrical waveform;

segmenting said electrical waveform into a plurality of electrical signals, each of said plurality of electrical signals corresponding to a pixel of said image and digitizing the amplitude of each of said signals to form a greyscale signal to form a first representation of said image;

processing each greyscale signal to form a second representation of said image;

converting said second representation into a third representation, whereby the information of each pixel at a location (hereinafter: pixel (X,Y)) and the nearest adjacent neighbors of said pixel are embedded in a single value assigned to a corresponding location (hereinafter: P(X,Y)) in the third representation;

scanning said third representation until a first non-zero P(X,Y) value is reached;

comparing said (P(X,Y) value and an input direction value to a look-up table to determine the next location of the non-zero value of P(X,Y) and forming a chaining code; and continuing said chaining code formation until all non-zero values of P(X,Y) have been located.

14. The method of claim 13 further comprising storing said third representation.

15. The method of claim 13 further comprising the step of assigning a value of zero to P(X,Y) once the value of P(X,Y) has been compared to a look-up table to determine the next location of the non-zero value of P(X,Y).

16. The method of claim 15 wherein said processing step further comprises:
comparing each greyscale signal to a pre-set threshold signal.

* * * * *